US012803799B2

(12) United States Patent
Bathula et al.

(10) Patent No.: US 12,803,799 B2
(45) Date of Patent: Nov. 17, 2026

(54) ZERO-TRUST SECURE KEY STORAGE AND AUTHENTICATION

(71) Applicant: ServiceNow, Inc., Santa Clara, CA (US)

(72) Inventors: Anil Bathula, Santa Clara, CA (US); Karthik Balakrishna, Santa Clara, CA (US); Pramith Reddy, Santa Clara, CA (US); Sugandh Rakha, Vancouver (CA); Pierce Edward Courtney, Santa Clara, CA (US); Mahesh Bingi, Santa Clara, CA (US); Nivedita Banerjee, Santa Clara, CA (US); Shreyansh Sharma, Santa Clara, CA (US); Srikanth Gunuru, Santa Clara, CA (US); Jonathan Chow, Santa Clara, CA (US); Andrew Gutierrez, Santa Clara, CA (US)

(73) Assignee: ServiceNow, Inc., Santa Clara, CA (US)

( * ) Notice: Subject to any disclaimer, the term of this patent is extended or adjusted under 35 U.S.C. 154(b) by 60 days.

(21) Appl. No.: 19/040,435

(22) Filed: Jan. 29, 2025

(65) Prior Publication Data

US 2026/0222196 A1 Jul. 30, 2026

(51) Int. Cl.

*H04L 9/08* (2006.01)
*H04L 9/32* (2006.01)
*H04L 9/40* (2022.01)

(52) U.S. Cl.

CPC .......... *H04L 9/0894* (2013.01); *H04L 9/3228* (2013.01); *H04L 63/0281* (2013.01); *H04L 63/166* (2013.01)

(58) Field of Classification Search

CPC . H04L 9/0894; H04L 9/3228; H04L 63/0281; H04L 63/166

See application file for complete search history.

(56) References Cited

U.S. PATENT DOCUMENTS 5,727,159 A * 3/1998 Kikinis ............... H04L 67/5651 707/E17.121
6,356,941 B1 3/2002 Cohen
8,199,507 B2 6/2012 Shohet (Continued)

OTHER PUBLICATIONS

International Search Report and Written Opinion, PCT Application PCT/US2025/056438, mailed Apr. 1, 2026.
ServiceNow, Washington DC Platform security, Jan. 2, 2025.

*Primary Examiner* — Jason Chiang
(74) *Attorney, Agent, or Firm* — McDonnell Boehnen Hulbert & Berghoff LLP

(57) ABSTRACT

An embodiment may involve receiving, by a proxy server within a network, a request from a first device to communicate with a second device within the network. The first device may be external to the network. The first example embodiment may also involve querying, using a first security credential, a keystore within the network. The keystore maintains security credentials associated with devices within the network. The first example embodiment may also involve receiving, from the keystore, a second security credential associated with the second device. The first example embodiment may also involve facilitating, by the proxy server, communication between the first device and the second device using the second security credential.

19 Claims, 11 Drawing Sheets

(56) References Cited

U.S. PATENT DOCUMENTS

| | | | | |
|---|---|---|---|---|
| 9,374,351 | B1 * | 6/2016 | Basha P. R. | H04L 67/56 |
| 9,729,515 | B1 * | 8/2017 | Anantharaju | H04L 63/0876 |
| 9,769,266 | B2 * | 9/2017 | Stuntebeck | H04L 63/10 |
| 10,587,592 | B2 * | 3/2020 | Koya | H04L 63/10 |
| 10,635,716 | B2 * | 4/2020 | Naar | H04L 63/0428 |
| 10,958,662 | B1 * | 3/2021 | Sole | H04L 63/0853 |
| 11,223,489 | B1 * | 1/2022 | Miller | H04L 9/0897 |
| 11,240,271 | B2 | 2/2022 | Wiener | |
| 11,729,170 | B2 | 8/2023 | Jafari | |
| 11,924,169 | B1 * | 3/2024 | Yoskowitz | H04L 47/125 |
| 12,238,791 | B1 * | 2/2025 | Delaney | H04L 67/2895 |
| 2002/0194292 | A1 * | 12/2002 | King | H04L 63/0281 709/213 |
| 2003/0097576 | A1 * | 5/2003 | Dutta | G07B 17/00733 713/189 |
| 2003/0187960 | A1 * | 10/2003 | Koba | H04L 67/5682 709/219 |
| 2004/0078312 | A1 * | 4/2004 | Bush | G06Q 30/02 705/35 |
| 2007/0271458 | A1 | 11/2007 | Bosch | |
| 2008/0077809 | A1 | 3/2008 | Hayler | |
| 2013/0247144 | A1 * | 9/2013 | Marshall | G06F 21/335 726/1 |
| 2014/0189119 | A1 * | 7/2014 | Stuntebeck | H04L 67/51 709/225 |
| 2014/0208100 | A1 * | 7/2014 | Kendall | G06F 21/6281 713/187 |
| 2015/0113614 | A1 * | 4/2015 | Sarkuni | H04L 63/08 726/5 |
| 2015/0304292 | A1 * | 10/2015 | Dulkin | G06F 21/31 726/7 |
| 2016/0006712 | A1 * | 1/2016 | Sade | H04L 63/08 726/5 |
| 2016/0028698 | A1 * | 1/2016 | Antipa | G06F 21/606 713/150 |
| 2017/0104641 | A1 * | 4/2017 | Bradshaw | G06F 16/951 |
| 2017/0149811 | A1 * | 5/2017 | Corrales | G05B 19/4185 |
| 2017/0251019 | A1 * | 8/2017 | Mazzitelli | G06F 11/3452 |
| 2017/0318009 | A1 * | 11/2017 | Pranam | H04L 63/0281 |
| 2018/0145965 | A1 * | 5/2018 | Pranam | H04L 63/083 |
| 2018/0152335 | A1 * | 5/2018 | Matsuki | H04L 69/16 |
| 2018/0183778 | A1 * | 6/2018 | Bettenburg | H04L 63/083 |
| 2018/0324159 | A1 * | 11/2018 | Koya | H04L 63/10 |
| 2019/0103970 | A1 * | 4/2019 | Koszek | H04L 63/0428 |
| 2020/0336466 | A1 | 10/2020 | Goldschlag | |
| 2023/0247003 | A1 | 8/2023 | Chanak | |
| 2024/0061941 | A1 | 2/2024 | Spalka | |
| 2024/0193255 | A1 * | 6/2024 | Quinlan | G06F 21/44 |
| 2024/0288300 | A1 * | 8/2024 | Honig | G06Q 30/018 |
| 2024/0291819 | A1 * | 8/2024 | Narula | H04W 12/63 |
| 2024/0378066 | A1 * | 11/2024 | Derr | H04L 67/146 |
| 2025/0038960 | A1 * | 1/2025 | Song | H04L 9/0825 |
| 2025/0373435 | A1 * | 12/2025 | Le Saint | H04L 9/3226 |

* cited by examiner

ZERO-TRUST SECURE KEY STORAGE AND AUTHENTICATION

BACKGROUND

Many computer networks are configured to allow devices from outside of the network to access devices and/or services within the network. However, doing so in a secure fashion typically results in the devices outside of the network storing security credentials (e.g., userid/password pairs) of devices within the network at least on a temporary basis. Such storage can be a security risk if a potential attacker (e.g., a user or malware) gains access to these credentials. This risk is significant given that the network may not be able to control how strictly the outside devices follow best practices when storing security credentials. Accordingly, the network may be subject to data corruption and/or loss, as well as disruptions and downtime. Additionally, the computing resources (e.g., processor capacity, memory capacity, network capacity, and energy usage) of compromised networks can be wasted or misused during and after such a breach.

SUMMARY

The embodiments herein overcome the above security disadvantages by exposing at most a limited number of security credentials to outside entities at any time, as well as providing control over the storage location of the security credentials and information relating to communications with the network. In particular, the embodiments herein provide that certain security credentials are not distributed outside of the network. This reduces the risk of security credentials becoming available to malicious actors and used for attacks on the network, which may result in data corruption and/or loss, as well as disruptions and downtime.

Specifically, a proxy server on the network acts as a "gatekeeper" for devices within the network, and only allows access to devices with the proper security credentials. For instance, an outside device may request to access or communicate with a device within the network. However, rather than using security credentials that are stored on the outside device, as in current techniques, the embodiments herein provide that the proxy server retrieves the appropriate security credentials from a keystore located within the network, and then uses those credentials to facilitate communication between the outside device and the device within the network.

Thus, sensitive information can be stored on the network itself, and consequently the information available for potential attackers to glean regarding the network is reduced. This improves the security of the network by limiting the possible vectors or pathways along which a malicious actor may attack the network, further reducing the risk of disruptions and downtime that would result.

Accordingly, a first example embodiment may involve receiving, by a proxy server within a network, a request from a first device to communicate with a second device within the network. The first device may be external to the network. The first example embodiment may also involve querying, using a first security credential, a keystore within the network. The keystore maintains security credentials associated with devices within the network. The first example embodiment may also involve receiving, from the keystore, a second security credential associated with the second device. The first example embodiment may also involve facilitating, by the proxy server, communication between the first device and the second device using the second security credential.

A second example embodiment may involve a proxy server within a network. The proxy server may include one or more processors, as well as memory and program instructions. The program instructions may be stored in the memory, and upon execution by the at least one processor, cause the proxy server to perform operations. The operations may involve receiving a request from a first device to communicate with a second device within the network, The first device may be external to the network. The operations may also involve querying, using a first security credential, a keystore within the network. The keystore maintains security credentials associated with devices within the network. The operations may also involve receiving, from the keystore, a second security credential associated with the second device. The operations may also involve facilitating communication between the first device and the second device using the second security credential.

A third example embodiment may involve a non-transitory computer-readable medium, having stored thereon program instructions that, upon execution by a computing system, cause the computing system to perform operations in accordance with any of the previous example embodiments.

In a fourth example embodiment, a system may include various means for carrying out each of the operations of any of the previous example embodiments.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

DETAILED DESCRIPTION

Figure 1:
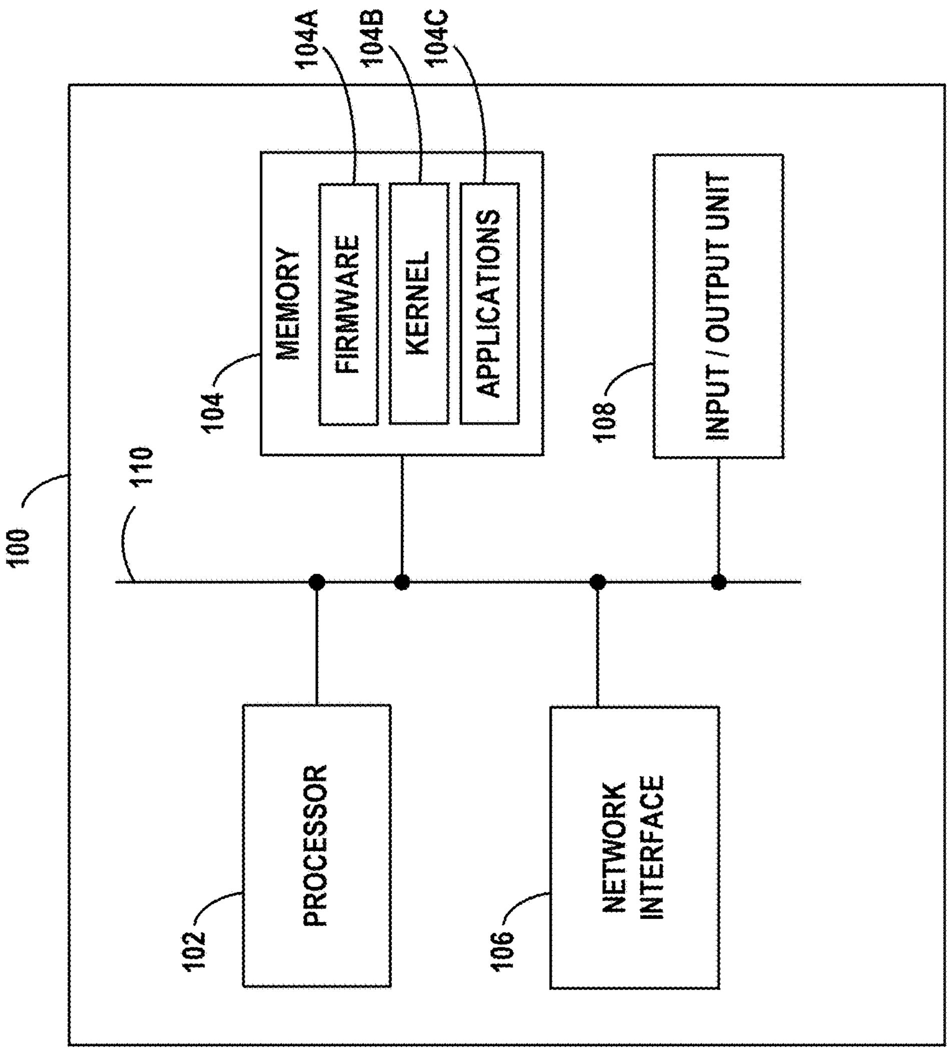
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of software features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

Unless clearly indicated otherwise herein, the term "or" is to be interpreted as the inclusive disjunction. For example, the phrase "A, B, or C" is true if any one or more of the arguments A, B, C are true, and is only false if all of A, B, and C are false.

I. Example Technical Improvements

These embodiments provide a technical solution to a technical problem. One technical problem being addressed is accomplishing network communications between devices on a network and devices outside of the network in a secure fashion. In practice, this is problematic because current techniques for such communications typically result in the devices outside of the network storing security credentials (e.g., userid/password pairs and/or security certificates) of devices within the network at least on a temporary basis.

However, such storage can be a security risk if a potential attacker (e.g., a malicious actor or malware program) gains access to these credentials. This risk is significant given that the network may not be able to control how strictly the outside devices follow best practices when storing security credentials.

The embodiments herein overcome these problems by limiting access to networks to devices outside of such networks in a manner that does not expose more than a limited number of security credentials to outside entities at one time, as well as providing a level of control to the network over the storage location of the security credentials and information relating to communications with the network.

In particular, the embodiments herein provide that certain security credentials are not distributed outside of the network. This reduces the risk of security credentials becoming available to malicious actors and used for attacks on the network, which may result in data corruption and/or loss, as well as disruptions and downtime.

Additionally, the embodiments herein provide that some sensitive information relating to network communications is stored directly on the network as opposed to being stored on an outside device. For instance, sensitive information regarding the architecture of the network may be used by a malicious actor to craft an attack. However, by allowing for this information to be stored on the network itself, the information available for potential attackers to glean regarding the network is also reduced. This improves the security of the network by limiting the possible vectors or pathways along which a malicious actor may attack the network, further reducing the risk of disruptions and downtime that would result.

Other technical improvements may also flow from these embodiments, and other technical problems may be solved. Thus, this statement of technical improvements is not limiting and instead constitutes examples of advantages that can be realized from the embodiments.

II. Introduction

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM), IT service management (ITSM), IT operations management (ITOM), and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its operations, innovate, and meet regulatory requirements. The enterprise may find it difficult to integrate, streamline, and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) has been introduced to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflows for IT, HR, CRM, customer service, application development, and security. Nonetheless, the embodiments herein are not limited to enterprise applications or environments, and can be more broadly applied.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, and delete (CRUD) capabilities. This allows new applications to be built on a common application infrastructure. In some cases, applications structured differently than MVC, such as those using unidirectional data flow, may be employed.

The aPaaS system may support standardized application components, such as a standardized set of widgets and/or web components for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data are stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of pre-defined functionality that can be added to applications. These features include support for searching, email, templating, workflow design, reporting, analytics, social media, scripting, mobile-friendly output, and customized GUIs.

Such an aPaaS system may represent a GUI in various ways. For example, a server device of the aPaaS system may generate a representation of a GUI using a combination of HyperText Markup Language (HTML) and JAVASCRIPT®. The JAVASCRIPT® may include client-side executable code, server-side executable code, or both. The server device may transmit or otherwise provide this representation to a client device for the client device to display on a screen according to its locally-defined look and feel. Alternatively, a representation of a GUI may take other forms, such as an intermediate form (e.g., JAVA® byte-code) that a client device can use to directly generate graphical output therefrom. Other possibilities exist, including but not limited to metadata-based encodings of web components, and various uses of JAVASCRIPT® Object Notation (JSON) and/or eXtensible Markup Language (XML) to represent various aspects of a GUI.

Further, user interaction with GUI elements, such as buttons, menus, tabs, sliders, checkboxes, toggles, etc. may be referred to as "selection", "activation", or "actuation" thereof. These terms may be used regardless of whether the GUI elements are interacted with by way of keyboard, pointing device, touchscreen, or another mechanism.

An aPaaS architecture is particularly powerful when integrated with an enterprise's network and used to manage such a network. The following embodiments describe architectural and functional aspects of example aPaaS systems, as well as the features and advantages thereof.

III. Example Computing Devices and Cloud-based Computing Environments

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and input/output unit 108, all of which may be coupled by system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a graphical processing unit (GPU), a digital signal processor (DSP), a network processor, an encryption processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently used instructions and data.

GPUs, in particular, have grown in importance. They include specialized circuitry designed to perform rapid mathematical calculations for rendering graphics, processing large datasets, and supporting machine learning. A GPU typically consists of hundreds or thousands of small cores that operate simultaneously, facilitating the decomposition of tasks into smaller, more manageable pieces that are processed in parallel. This parallelism allows GPUs to be significantly faster than traditional CPUs for certain types of calculations.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Herein, any non-volatile memory may be referred to as persistent storage.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and buses) of computing device 100. Applications 104C may be one or more user-space software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, 10 Gigabit Ethernet, Ethernet over fiber, and so on). Network interface 106 may also support communication over one or more non-Ethernet media, such as coaxial cables or power lines, or over wide-area media, such as Synchronous Optical Networking (SONET), Synchronous Digital Hierarchy (SDH), Data Over Cable Service Interface Specification (DOCSIS), or other technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more computing devices like computing device 100 may be deployed. The exact physical location, connectivity, and configuration of these computing devices may be unknown and/or unimportant to client devices. Accordingly, the computing devices may be referred to as "cloud-based" devices that may be housed at various remote data center locations.

Figure 2:
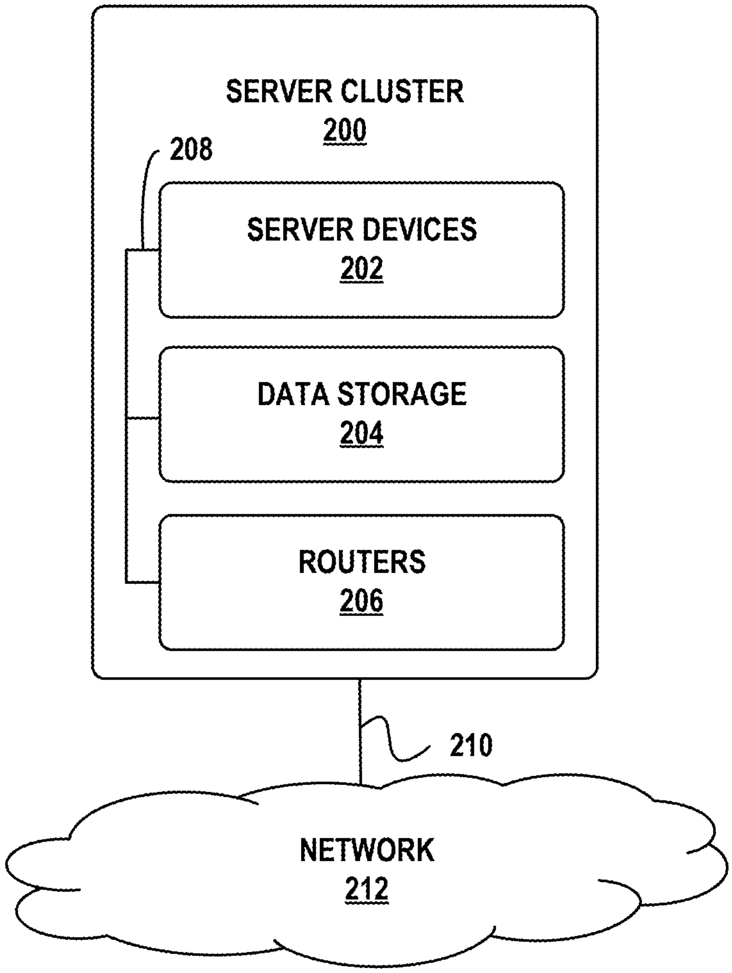
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purposes of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via local cluster network 208, and/or (ii) network communications between server cluster 200 and other devices via communication link 210 to network 212.

Additionally, the configuration of routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency, and/or other design goals of the system architecture.

As a possible example, data storage 204 may include any form of database, such as a structured query language (SQL) database or a No-SQL database (e.g., MongoDB). Various types of data structures may store the information in such a database, including but not limited to files, tables, arrays, lists, trees, and tuples. Furthermore, any databases in data storage 204 may be monolithic or distributed across multiple physical devices.

Server devices 202 may be configured to transmit data to and receive data from data storage 204. This transmission and retrieval may take the form of SQL queries or other types of database queries, and the output of such queries, respectively. Additional text, images, video, and/or audio may be included as well. Furthermore, server devices 202 may organize the received data into web page or web application representations. Such a representation may take the form of a markup language, such as HTML, XML, JSON, or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JAVASCRIPT®, and so on. Computer program code written in these languages may facilitate the providing of web pages to client devices, as well as client device interaction with the web pages. Alternatively or additionally, JAVA® may be used to facilitate generation of web pages and/or to provide web application functionality.

IV. Example Remote Network Management Architecture

Figure 3:
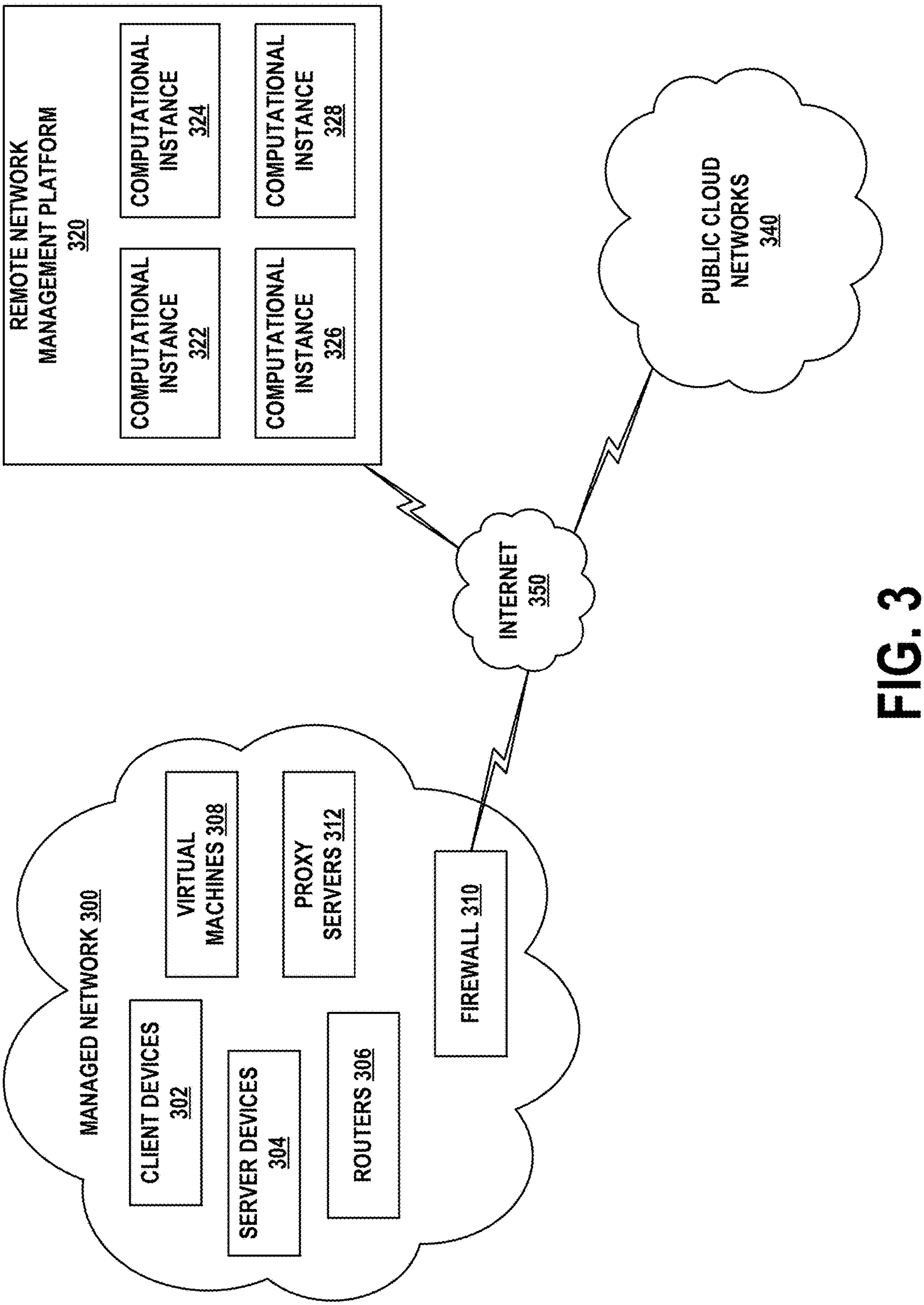
FIG. 3 depicts a remote network management architecture, in accordance with example embodiments.

FIG. 3 depicts a remote network management architecture, in accordance with example embodiments. This architecture includes three main components—managed network 300, remote network management platform 320, and public cloud networks 340—all connected by way of Internet 350.

A. Managed Networks

Managed network 300 may be, for example, an enterprise network used by an entity for computing and communications tasks, as well as storage of data. Thus, managed network 300 may include client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server application that facilitates communication and movement of data between managed network 300, remote network management platform 320, and public cloud networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components.

Possibly with the assistance of proxy servers 312, remote network management platform 320 may also be able to discover and manage aspects of public cloud networks 340 that are used by managed network 300. While not shown in FIG. 3, one or more proxy servers 312 may be placed in any of public cloud networks 340 in order to facilitate this discovery and management.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

B. Remote Network Management Platforms

Remote network management platform 320 is a hosted environment that provides aPaaS services to users, particularly to the operator of managed network 300. These services may take the form of web-based portals, for example, using the aforementioned web-based technologies. Thus, a user can securely access remote network management platform 320 from, for example, client devices 302, or potentially from a client device outside of managed network 300. By way of the web-based portals, users may design, test, and deploy applications, generate reports, view analytics, and perform other tasks. Remote network management platform 320 may also be referred to as a multi-application platform.

As shown in FIG. 3, remote network management platform 320 includes four computational instances 322, 324, 326, and 328. Each of these computational instances may represent one or more server nodes operating dedicated copies of the aPaaS software and/or one or more database nodes. The arrangement of server and database nodes on physical server devices and/or virtual machines can be flexible and may vary based on enterprise needs. In combination, these nodes may provide a set of web portals, services, and applications (e.g., a wholly-functioning aPaaS system) available to a particular enterprise. In some cases, a single enterprise may use multiple computational instances.

For example, managed network 300 may be an enterprise customer of remote network management platform 320, and may use computational instances 322, 324, and 326. The reason for providing multiple computational instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation. Any application deployed onto a computational instance may be a scoped application, in that its access to databases within the computational instance can be restricted to certain elements therein (e.g., one or more particular database tables or particular rows within one or more database tables).

For purposes of clarity, the disclosure herein refers to the arrangement of application nodes, database nodes, aPaaS software executing thereon, and underlying hardware as a "computational instance." Note that users may colloquially refer to the graphical user interfaces provided thereby as "instances." But unless it is defined otherwise herein, a "computational instance" is a computing system disposed within remote network management platform 320.

The multi-instance architecture of remote network management platform 320 is in contrast to conventional multi-tenant architectures, over which multi-instance architectures exhibit several advantages. In multi-tenant architectures, data from different customers (e.g., enterprises) are comingled in a single database. While these customers'data are separate from one another, the separation is enforced by the software that operates the single database. As a consequence, a security breach in this system may affect all customers'data, creating additional risk, especially for entities subject to governmental, healthcare, and/or financial regulation. Furthermore, any database operations that affect one customer will likely affect all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In some embodiments, remote network management platform 320 may include one or more central instances, controlled by the entity that operates this platform. Like a computational instance, a central instance may include some number of application and database nodes disposed upon some number of physical server devices or virtual machines. Such a central instance may serve as a repository for specific configurations of computational instances as well as data that can be shared amongst at least some of the computational instances. For instance, definitions of common security threats that could occur on the computational instances, software packages that are commonly discovered on the computational instances, and/or an application store for applications that can be deployed to the computational instances may reside in a central instance. Computational instances may communicate with central instances by way of well-defined interfaces in order to obtain this data.

In order to support multiple computational instances in an efficient fashion, remote network management platform 320 may implement a plurality of these instances on a single hardware platform. For example, when the aPaaS system is implemented on a server cluster such as server cluster 200, it may operate virtual machines that dedicate varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, a computational instance such as computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

C. Public Cloud Networks

Public cloud networks 340 may be remote server devices (e.g., a plurality of server clusters such as server cluster 200) that can be used for outsourced computation, data storage, communication, and service hosting operations. These servers may be virtualized (i.e., the servers may be virtual machines). Examples of public cloud networks 340 may include Amazon AWS Cloud, Microsoft Azure Cloud (Azure), Google Cloud Platform (GCP), and IBM Cloud Platform. Like remote network management platform 320, multiple server clusters supporting public cloud networks 340 may be deployed at geographically diverse locations for purposes of load balancing, redundancy, and/or high availability.

Managed network 300 may use one or more of public cloud networks 340 to deploy applications and services to its clients and customers. For instance, if managed network 300 provides online music streaming services, public cloud networks 340 may store the music files and provide web interface and streaming capabilities. In this way, the enterprise of managed network 300 does not have to build and maintain its own servers for these operations.

Remote network management platform 320 may include modules that integrate with public cloud networks 340 to expose virtual machines and managed services therein to managed network 300. The modules may allow users to request virtual resources, discover allocated resources, and provide flexible reporting for public cloud networks 340. In order to establish this functionality, a user from managed network 300 might first establish an account with public cloud networks 340, and request a set of associated resources. Then, the user may enter the account information into the appropriate modules of remote network management platform 320. These modules may then automatically discover the manageable resources in the account, and also provide reports related to usage, performance, and billing.

D. Communication Support and Other Operations

Internet 350 may represent a portion of the global Internet. However, Internet 350 may alternatively represent a different type of network, such as a private wide-area or local-area packet-switched network.

Figure 4:
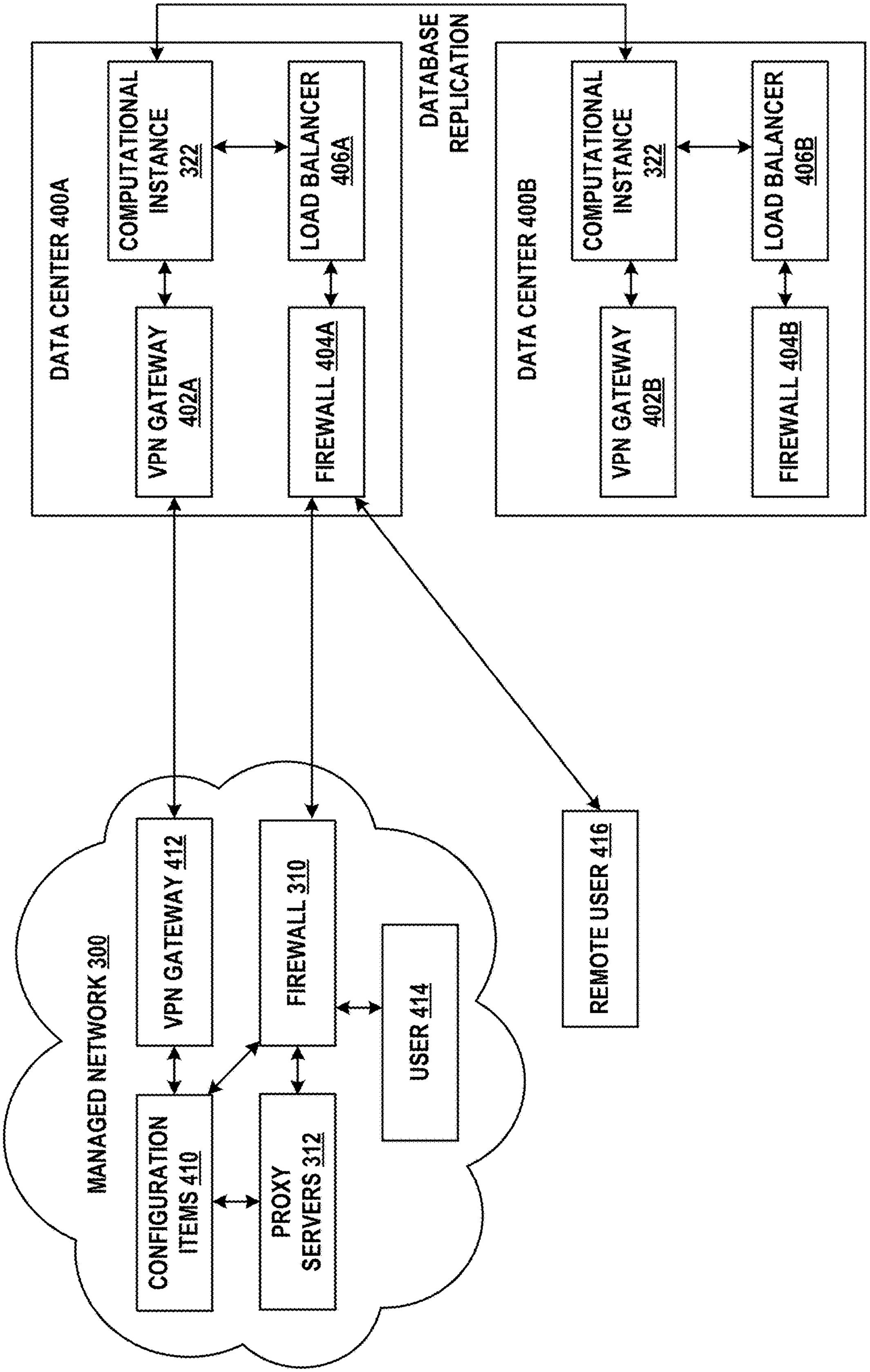
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated, in whole or in part, across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any components thereof, any applications or services executing thereon, as well as relationships between devices, components, applications, and services. Thus, the term "configuration items" may be shorthand for part of all of any physical or virtual device, or any application or service remotely discoverable or managed by computational instance 322, or relationships between discovered devices, applications, and services. Configuration items may be represented in a configuration management database (CMDB) of computational instance 322.

As stored or transmitted, a configuration item may be a list of attributes that characterize the hardware or software that the configuration item represents. These attributes may include manufacturer, vendor, location, owner, unique identifier, description, network address, operational status, serial number, time of last update, and so on. The class of a configuration item may determine which subset of attributes are present for the configuration item (e.g., software and hardware configuration items may have different lists of attributes).

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively). In various alternatives, devices in managed network 300, such as proxy servers 312, may use a secure protocol (e.g., TLS) to communicate directly with one or more data centers.

V. Example Discovery

In order for remote network management platform 320 to administer the devices, applications, and services of managed network 300, remote network management platform 320 may first determine what devices are present in managed network 300, the configurations, constituent components, and operational statuses of these devices, and the applications and services provided by the devices. Remote network management platform 320 may also determine the relationships between discovered devices, their components, applications, and services. Representations of these devices, components, applications, and services may be referred to as configuration items.

The process of determining the configuration items and relationships therebetween within managed network 300 is referred to as discovery, and may be facilitated at least in part by proxy servers 312. To that point, proxy servers 312 may relay discovery requests and responses between managed network 300 and remote network management platform 320.

Configuration items and relationships may be stored in a CMDB and/or other locations. Further, configuration items may be of various classes that define their constituent attributes and that exhibit an inheritance structure not unlike object-oriented software modules. For instance, a configuration item class of “server” may inherit all attributes from a configuration item class of “hardware” and also include further server-specific attributes. Likewise, a configuration item class of “LINUX® server” may inherit all attributes from the configuration item class of “server” and also include further LINUX®-specific attributes. Additionally, configuration items may represent other components, such as services, data center infrastructure, software licenses, units of source code, configuration files, and documents.

While this section describes discovery conducted on managed network 300, the same or similar discovery procedures may be used on public cloud networks 340. Thus, in some environments, “discovery” may refer to discovering configuration items and relationships on a managed network and/or one or more public cloud networks.

For purposes of the embodiments herein, an “application” may refer to one or more processes, threads, programs, client software modules, server software modules, or any other software that executes on a device or group of devices. A “service” may refer to a high-level capability provided by one or more applications executing on one or more devices working in conjunction with one another. For example, a web service may involve multiple web application server threads executing on one device and accessing information from a database application that executes on another device.

Figure 5:
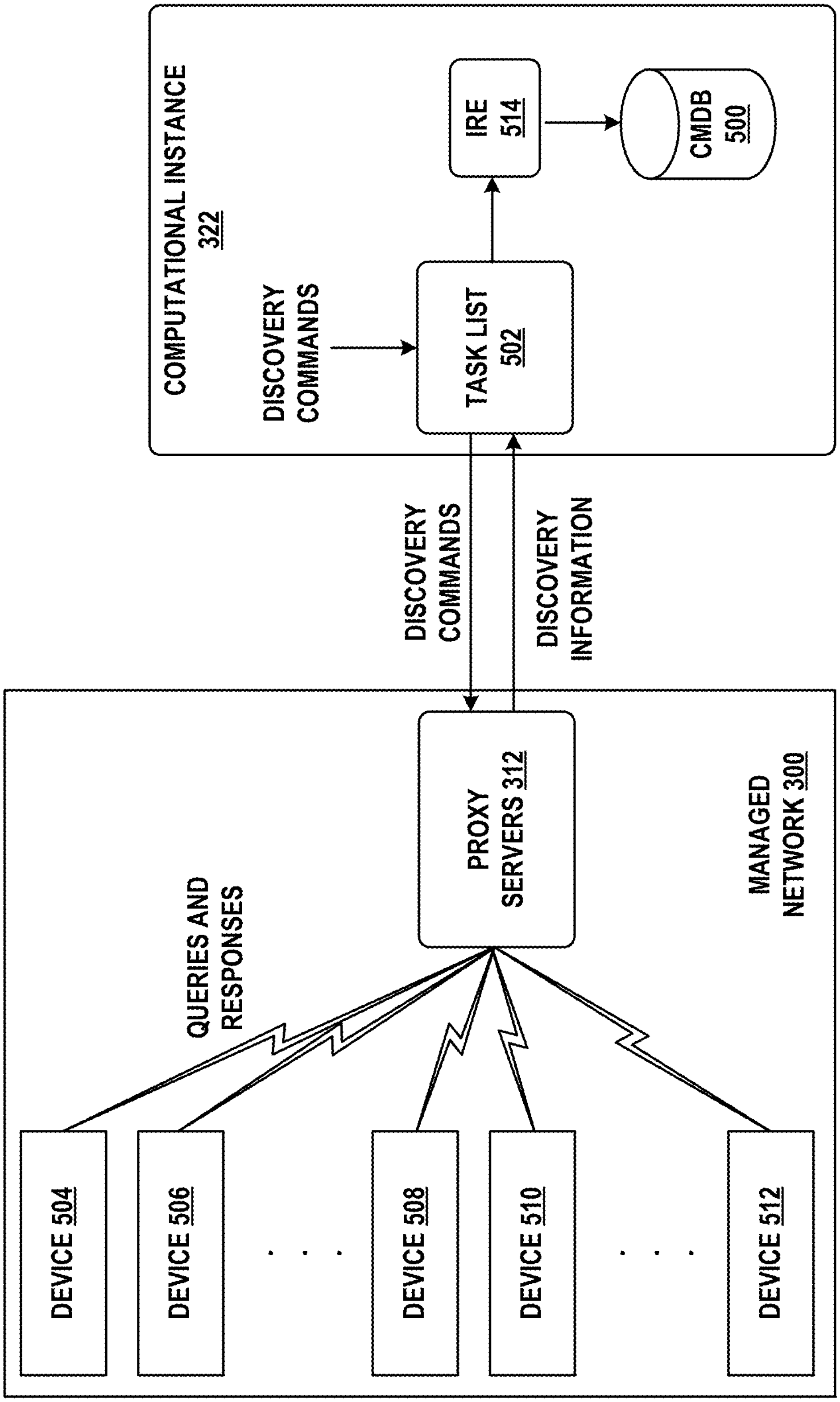
FIG. 5 depicts another communication environment involving a remote network management architecture, in accordance with example embodiments.

FIG. 5 provides a logical depiction of how configuration items and relationships can be discovered, as well as how information related thereto can be stored. For sake of simplicity, remote network management platform 320, public cloud networks 340, and Internet 350 are not shown.

In FIG. 5, CMDB 500, task list 502, and identification and reconciliation engine (IRE) 514 are disposed and/or operate within computational instance 322. Task list 502 represents a connection point between computational instance 322 and proxy servers 312. Task list 502 may be referred to as a queue, or more particularly as an external communication channel (ECC) queue. Task list 502 may represent not only the queue itself but any associated processing, such as adding, removing, and/or manipulating information in the queue.

As discovery takes place, computational instance 322 may store discovery tasks (jobs) that proxy servers 312 are to perform in task list 502, until proxy servers 312 request these tasks in batches of one or more. Placing the tasks in task list 502 may trigger or otherwise cause proxy servers 312 to begin their discovery operations. For example, proxy servers 312 may poll task list 502 periodically or from time to time, or may be notified of discovery commands in task list 502 in some other fashion. Alternatively or additionally, discovery may be manually triggered or automatically triggered based on triggering events (e.g., discovery may automatically begin once per day at a particular time).

Regardless, computational instance 322 may transmit these discovery commands to proxy servers 312 upon request. For example, proxy servers 312 may repeatedly query task list 502, obtain the next task therein, and perform this task until task list 502 is empty or another stopping condition has been reached. In response to receiving a discovery command, proxy servers 312 may query various devices, components, applications, and/or services in managed network 300 (represented for sake of simplicity in FIG. 5 by devices 504, 506, 508, 510, and 512). These devices, components, applications, and/or services may provide responses relating to their configuration, operation, and/or status to proxy servers 312. In turn, proxy servers 312 may then provide this discovered information to task list 502 (i.e., task list 502 may have an outgoing queue for holding discovery commands until requested by proxy servers 312 as well as an incoming queue for holding the discovery information until it is read).

IRE 514 may be a software module that removes discovery information from task list 502 and formulates this discovery information into configuration items (e.g., representing devices, components, applications, and/or services discovered on managed network 300) as well as relationships therebetween. Then, IRE 514 may provide these configuration items and relationships to CMDB 500 for storage therein. The operation of IRE 514 is described in more detail below.

In this fashion, configuration items stored in CMDB 500 represent the environment of managed network 300. As an example, these configuration items may represent a set of physical and/or virtual devices (e.g., client devices, server devices, routers, or virtual machines), applications executing thereon (e.g., web servers, email servers, databases, or storage arrays), as well as services that involve multiple individual configuration items. Relationships may be pairwise definitions of arrangements or dependencies between configuration items.

In order for discovery to take place in the manner described above, proxy servers 312, CMDB 500, and/or one or more credential stores may be configured with credentials for the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

There are two general types of discovery—horizontal and vertical (top-down). Each are discussed below.

A. Horizontal Discovery

Horizontal discovery is used to scan managed network 300, find devices, components, and/or applications, and then populate CMDB 500 with configuration items representing these devices, components, and/or applications. Horizontal discovery also creates relationships between the configuration items. For instance, this could be a “runs on” relationship between a configuration item representing a software application and a configuration item representing a server device on which it executes. Typically, horizontal discovery is not aware of services and does not create relationships between configuration items based on the services in which they operate.

There are two versions of horizontal discovery. One relies on probes and sensors, while the other also employs patterns. Probes and sensors may be scripts (e.g., written in JAVASCRIPT®) that collect and process discovery information on a device and then update CMDB 500 accordingly. More specifically, probes explore or investigate devices on managed network 300, and sensors parse the discovery information returned from the probes.

Patterns are also scripts that collect data on one or more devices, process it, and update the CMDB. Patterns differ from probes and sensors in that they are written in a specific discovery programming language and are used to conduct detailed discovery procedures on specific devices, components, and/or applications that often cannot be reliably discovered (or discovered at all) by more general probes and sensors. Particularly, patterns may specify a series of operations that define how to discover a particular arrangement of devices, components, and/or applications, what credentials to use, and which CMDB tables to populate with configuration items resulting from this discovery.

Both versions may proceed in four logical phases: scanning, classification, identification, and exploration. Also, both versions may require specification of one or more ranges of IP addresses on managed network 300 for which discovery is to take place. Each phase may involve communication between devices on managed network 300 and proxy servers 312, as well as between proxy servers 312 and task list 502. Some phases may involve storing partial or preliminary configuration items in CMDB 500, which may be updated in a later phase.

In the scanning phase, proxy servers 312 may probe each IP address in the specified range(s) of IP addresses for open Transmission Control Protocol (TCP) and/or User Datagram Protocol (UDP) ports to determine the general type of device and its operating system. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist.

In the classification phase, proxy servers 312 may further probe each discovered device to determine the type of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the specific type of operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise, if a device was classified as WINDOWS® 10, as a set of WINDOWS®-10-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address(es) assigned to these network interface(s), IP address(es) used by the particular device and so on. This identification information may be stored as one or more configuration items in CMDB 500 along with any relevant relationships therebetween. Doing so may involve passing the identification information through IRE 514 to avoid generation of duplicate configuration items, for purposes of disambiguation, and/or to determine the table(s) of CMDB 500 in which the discovery information should be written.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (software applications), and so on. Once more, the discovered information may be stored as one or more configuration items in CMDB 500, as well as relationships.

Running horizontal discovery on certain devices, such as switches and routers, may utilize SNMP. Instead of or in addition to determining a list of running processes or other application-related information, discovery may determine additional subnets known to a router and the operational state of the router's network interfaces (e.g., active, inactive, queue length, number of packets dropped, etc.). The IP addresses of the additional subnets may be candidates for further discovery procedures. Thus, horizontal discovery may progress iteratively or recursively.

Patterns are used only during the identification and exploration phases—under pattern-based discovery, the scanning and classification phases operate as they would if probes and sensors are used. After the classification stage completes, a pattern probe is specified as a probe to use during identification. Then, the pattern probe and the pattern that it specifies are launched.

Patterns support a number of features, by way of the discovery programming language, that are not available or difficult to achieve with discovery using probes and sensors. For example, discovery of devices, components, and/or applications in public cloud networks, as well as configuration file tracking, is much simpler to achieve using pattern-based discovery. Further, these patterns are more easily customized by users than probes and sensors. Additionally, patterns are more focused on specific devices, components, and/or applications and therefore may execute faster than the more general approaches used by probes and sensors.

Once horizontal discovery completes, a configuration item representation of each discovered device, component, and/or application is available in CMDB 500. For example, after discovery, operating system version, hardware configuration, and network configuration details for client devices, server devices, and routers in managed network 300, as well as applications executing thereon, may be stored as configuration items. This collected information may be presented to a user in various ways to allow the user to view the hardware composition and operational status of devices.

Furthermore, CMDB 500 may include entries regarding the relationships between configuration items. More specifically, suppose that a server device includes a number of hardware components (e.g., processors, memory, network interfaces, storage, and file systems), and has several software applications installed or executing thereon. Relationships between the components and the server device (e.g., "contained by" relationships) and relationships between the software applications and the server device (e.g., "runs on" relationships) may be represented as such in CMDB 500.

More generally, the relationship between a software configuration item installed or executing on a hardware configuration item may take various forms, such as "is hosted on", "runs on", or "depends on". Thus, a database application installed on a server device may have the relationship "is hosted on" with the server device to indicate that the database application is hosted on the server device. In some embodiments, the server device may have a reciprocal relationship of "used by" with the database application to indicate that the server device is used by the database application. These relationships may be automatically found using the discovery procedures described above, though it is possible to manually set relationships as well.

In this manner, remote network management platform 320 may discover and inventory the hardware and software deployed on and provided by managed network 300.

B. Vertical Discovery

Vertical discovery is a technique used to find and map configuration items that are part of an overall service, such as a web service. For example, vertical discovery can map a web service by showing the relationships between a web server application, a LINUX® server device, and a database that stores the data for the web service. Typically, horizontal discovery is run first to find configuration items and basic relationships therebetween, and then vertical discovery is run to establish the relationships between configuration items that make up a service.

Patterns can be used to discover certain types of services, as these patterns can be programmed to look for specific arrangements of hardware and software that fit a description of how the service is deployed. Alternatively or additionally, traffic analysis (e.g., examining network traffic between devices) can be used to facilitate vertical discovery. In some cases, the parameters of a service can be manually configured to assist vertical discovery.

In general, vertical discovery seeks to find specific types of relationships between devices, components, and/or applications. Some of these relationships may be inferred from configuration files. For example, the configuration file of a web server application can refer to the IP address and port number of a database on which it relies. Vertical discovery patterns can be programmed to look for such references and infer relationships therefrom. Relationships can also be inferred from traffic between devices—for instance, if there is a large extent of web traffic (e.g., TCP port 80 or 8080) traveling between a load balancer and a device hosting a web server, then the load balancer and the web server may have a relationship.

Relationships found by vertical discovery may take various forms. As an example, an email service may include an email server software configuration item and a database application software configuration item, each installed on different hardware device configuration items. The email service may have a "depends on" relationship with both of these software configuration items, while the software configuration items have a "used by" reciprocal relationship with the email service. Such services might not be able to be fully determined by horizontal discovery procedures, and instead may rely on vertical discovery and possibly some extent of manual configuration.

C. Advantages of Discovery

Regardless of how discovery information is obtained, it can be valuable for the operation of a managed network. Notably, IT personnel can quickly determine where certain software applications are deployed, and what configuration items make up a service. This allows for rapid pinpointing of root causes of service outages or degradation. For example, if two different services are suffering from slow response times, the CMDB can be queried (perhaps among other activities) to determine that the root cause is a database application that is used by both services having high processor utilization. Thus, IT personnel can address the database application rather than waste time considering the health and performance of other configuration items that make up the services.

In another example, suppose that a database application is executing on a server device, and that this database application is used by an employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular hardware device fails.

In general, configuration items and/or relationships between configuration items may be displayed on a web-based interface and represented in a hierarchical fashion. Modifications to such configuration items and/or relationships in the CMDB may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in a single operation.

VI. CMDB Identification Rules and Reconciliation

A CMDB, such as CMDB 500, provides a repository of configuration items and relationships. When properly provisioned, it can take on a key role in higher-layer applications deployed within or involving a computational instance. These applications may relate to enterprise IT service management, operations management, asset management, configuration management, compliance, and so on.

For example, an IT service management application may use information in the CMDB to determine applications and services that may be impacted by a component (e.g., a server device) that has malfunctioned, crashed, or is heavily loaded. Likewise, an asset management application may use information in the CMDB to determine which hardware and/or software components are being used to support particular enterprise applications. As a consequence of the importance of the CMDB, it is desirable for the information stored therein to be accurate, consistent, and up to date.

A CMDB may be populated in various ways. As discussed above, a discovery procedure may automatically store information including configuration items and relationships in the CMDB. However, a CMDB can also be populated, as a whole or in part, by manual entry, configuration files, and third-party data sources. Given that multiple data sources may be able to update the CMDB at any time, it is possible that one data source may overwrite entries of another data source. Also, two data sources may each create slightly different entries for the same configuration item, resulting in a CMDB containing duplicate data. When either of these occurrences takes place, they can cause the health and utility of the CMDB to be reduced.

In order to mitigate this situation, these data sources might not write configuration items directly to the CMDB. Instead, they may write to an identification and reconciliation application programming interface (API) of IRE 514. Then, IRE 514 may use a set of configurable identification rules to uniquely identify configuration items and determine whether and how they are to be written to the CMDB.

In general, an identification rule specifies a set of configuration item attributes that can be used for this unique identification. Identification rules may also have priorities so that rules with higher priorities are considered before rules with lower priorities. Additionally, a rule may be independent, in that the rule identifies configuration items independently of other configuration items. Alternatively, the rule may be dependent, in that the rule first uses a metadata rule to identify a dependent configuration item.

Metadata rules describe which other configuration items are contained within a particular configuration item, or the host on which a particular configuration item is deployed. For example, a network directory service configuration item may contain a domain controller configuration item, while a web server application configuration item may be hosted on a server device configuration item.

A goal of each identification rule is to use a combination of attributes that can unambiguously distinguish a configuration item from all other configuration items, and is expected not to change during the lifetime of the configuration item. Some possible attributes for an example server device may include serial number, location, operating system, operating system version, memory capacity, and so on. If a rule specifies attributes that do not uniquely identify the configuration item, then multiple components may be represented as the same configuration item in the CMDB. Also, if a rule specifies attributes that change for a particular configuration item, duplicate configuration items may be created.

Thus, when a data source provides information regarding a configuration item to IRE 514, IRE 514 may attempt to match the information with one or more rules. If a match is found, the configuration item is written to the CMDB or updated if it already exists within the CMDB. If a match is not found, the configuration item may be held for further analysis.

Configuration item reconciliation procedures may be used to ensure that only authoritative data sources are allowed to overwrite configuration item data in the CMDB. This reconciliation may also be rules-based. For instance, a reconciliation rule may specify that a particular data source is authoritative for a particular configuration item type and set of attributes. Then, IRE 514 might only permit this authoritative data source to write to the particular configuration item, and writes from unauthorized data sources may be prevented. Thus, the authorized data source becomes the single source of truth regarding the particular configuration item. In some cases, an unauthorized data source may be allowed to write to a configuration item if it is creating the configuration item or the attributes to which it is writing are empty.

Additionally, multiple data sources may be authoritative for the same configuration item or attributes thereof. To avoid ambiguities, these data sources may be assigned precedences that are taken into account during the writing of configuration items. For example, a secondary authorized data source may be able to write to a configuration item's attribute until a primary authorized data source writes to this attribute. Afterward, further writes to the attribute by the secondary authorized data source may be prevented.

In some cases, duplicate configuration items may be automatically detected by IRE 514 or in another fashion. These configuration items may be deleted or flagged for manual de-duplication.

VII. Zero-Trust Authentication and Security Credential Storage

It can be desirable for a computer network to allow devices from outside of the network to access devices and services within the network. However, doing so in a secure fashion typically results in the devices outside of the network storing security credentials (e.g., userid/password pairs and/or security certificates) of devices within the network at least on a temporary basis.

Some networks may also make use of a proxy server, which may be a server application within the network that facilitates communication and movement of data between the devices within the network and those outside of it. In this way, a proxy server may act as a "gatekeeper" for devices within the network, and only allow access to devices with the proper security credentials. For instance, an outside device may present or provide a security credential to the proxy server, and the proxy server may then facilitate communication between the outside device and a device within the network.

However, this approach can involves possible risks if credentials are stored for an extended period of time or indefinitely, as the security risk of a potential attacker (e.g., a user or malware) gaining access to these credentials increases the longer the credentials are available outside of the network. This risk can be significant given that the network may not be able to control how strictly the outside devices follow best practices when storing security credentials. Accordingly, the network may be subject to data corruption and/or loss, as well as disruptions and downtime.

These security risks associated with the storage of security credentials by the devices outside the network can also lead to a problem of trust between the network and a device attempting to access the network. For instance, the network may not trust the device attempting to access the network to store the security credentials securely (e.g., when an outside device is a potential attacker or employs lax practices for storing security credentials).

In other situations, the network may store sensitive information (e.g., personally identifiable information), and thus the network may not trust an outside device to have access to such information. Such situations may be referred to as "zero-trust," as there is little or no trust regarding security credentials between the network and the device attempting to access the network, and can affect the decision-making of a network in deciding to grant access to outside devices.

To address these and other problems related to secure access to computer networks, the embodiments herein provide access to networks to devices outside of such networks in a manner that does not expose to outside entities more than a limited number of security credentials at one time, as well as providing a level of control to the network over the storage location of the security credentials and information relating to communications with the network. In particular, the embodiments herein present several approaches, each with different levels of privacy and security.

A. Example Systems

Figure 6A:
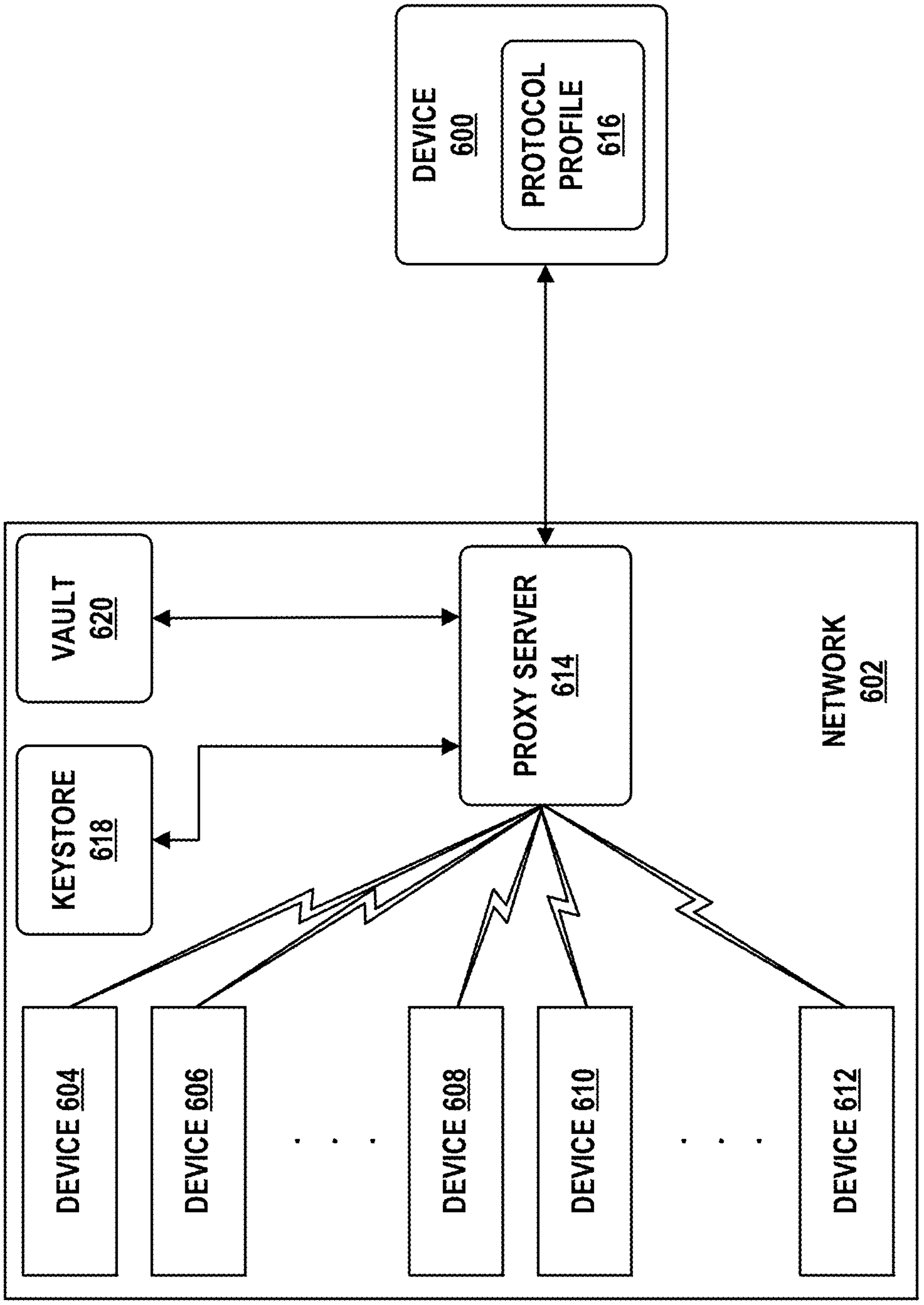
FIG. 6A depicts a first approach to credential storage and authentication for network communications, in accordance with example embodiments.

FIG. 6A illustrates a first approach to addressing problems described above. FIG. 6 depicts an example device 600 and an example network 602.

The device 600 is presented in FIG. 6 as one example, but in some embodiments could be any device, component, application, and/or service outside of the network 602. In some embodiments, the device 600 could be a computational instance of the remote network management platform 320, as described above.

The network 602 may include a proxy server 614, a keystore 618, and/or a vault 620. The proxy server 614 may operate on a system or device on the network 602, which may allow devices outside of the network 602 (e.g., the device 600) to communicate with various devices, components, applications, and/or services on the network 602 (represented for sake of simplicity in FIG. 6 by devices 604, 606, 608, 610, and 612).

The keystore 618 may be a repository of passwords, certificates and/or other security credentials located within the network 602. In some embodiments, the keystore 618 may be a dictionary or dictionary-like data structure that stores security credentials in a key-value format. To further limit access to the security credentials, the keystore 618 may be encrypted or otherwise secured and require a security credential of its own for access. Such a keystore access credential (KAC), will be elaborated upon below, and may be stored in the vault 620.

Some credentials stored in the keystore 618 may be limited-time credentials. For instance, such credentials may be issued by the keystore 618 and/or only be valid for no longer than a predetermined amount of time (e.g., 30 seconds, 1 minute, 5 minutes, 10 minutes, 1 hour, 1 day, etc.) before expiration. This additionally helps in reducing security risks, as even if a malicious actor gained access to such a limited-time credential, it could expire before the attacker has the chance to use it in an attack.

Other credentials stored in the keystore 618 may be single or one-time use credentials, for example a one-time password (OTP). In this way, even if a malicious actor gained access to an OTP, they could not use it in an attack as the OTP would have already been use in the normal course of operations.

The vault 620 may be a secure element or other location within the network 602. For instance, the vault 620 could be a dedicated hardware chip or component located on a device on the network 602 that is designed to be tamper-resistant. This may allow such a vault 620 to securely store sensitive data such as security credentials even if the host system or network is compromised by a malicious actor. In some embodiments, the vault 620 may be configured to only allow access to certain users (e.g., an administrator or superuser) or certain devices (such as the proxy server 614). In other words, the vault 620 may be configured to deny access by default to all devices on the network except those in a predetermined list. In some embodiments, the predetermined list includes the proxy server 614.

The device 600 may in some embodiments include a protocol profile 616. The protocol profile 616 is a purpose-built data structure that may include one or more parameters related to communication between devices within and outside of the network 602. These parameters may include including a file path (e.g., a URL, location within a filesystem on a device, or a location within a shared filesystem of the network 602) of the keystore 618, one or more security credentials associated with devices on the network 602, a specification of a secure communication protocol to be used in communications between devices within and outside of the network 602, and/or a network port number (e.g., a transport layer port number such as a TCP and/or UDP port) to be used in such communications. In some embodiments, the protocol profile 616 may be stored as a file in XML, JSON, SQLite, or some other standardized or proprietary format. In some embodiments, portions of the protocol profile 616 may be editable by one or more devices within the network 602.

However, this approach may have some disadvantages, as information contained in the protocol profile 616, such as the file path, may reveal sensitive information regarding the architecture of the network 602, which a malicious actor may use to craft an attack.

Figure 6B:
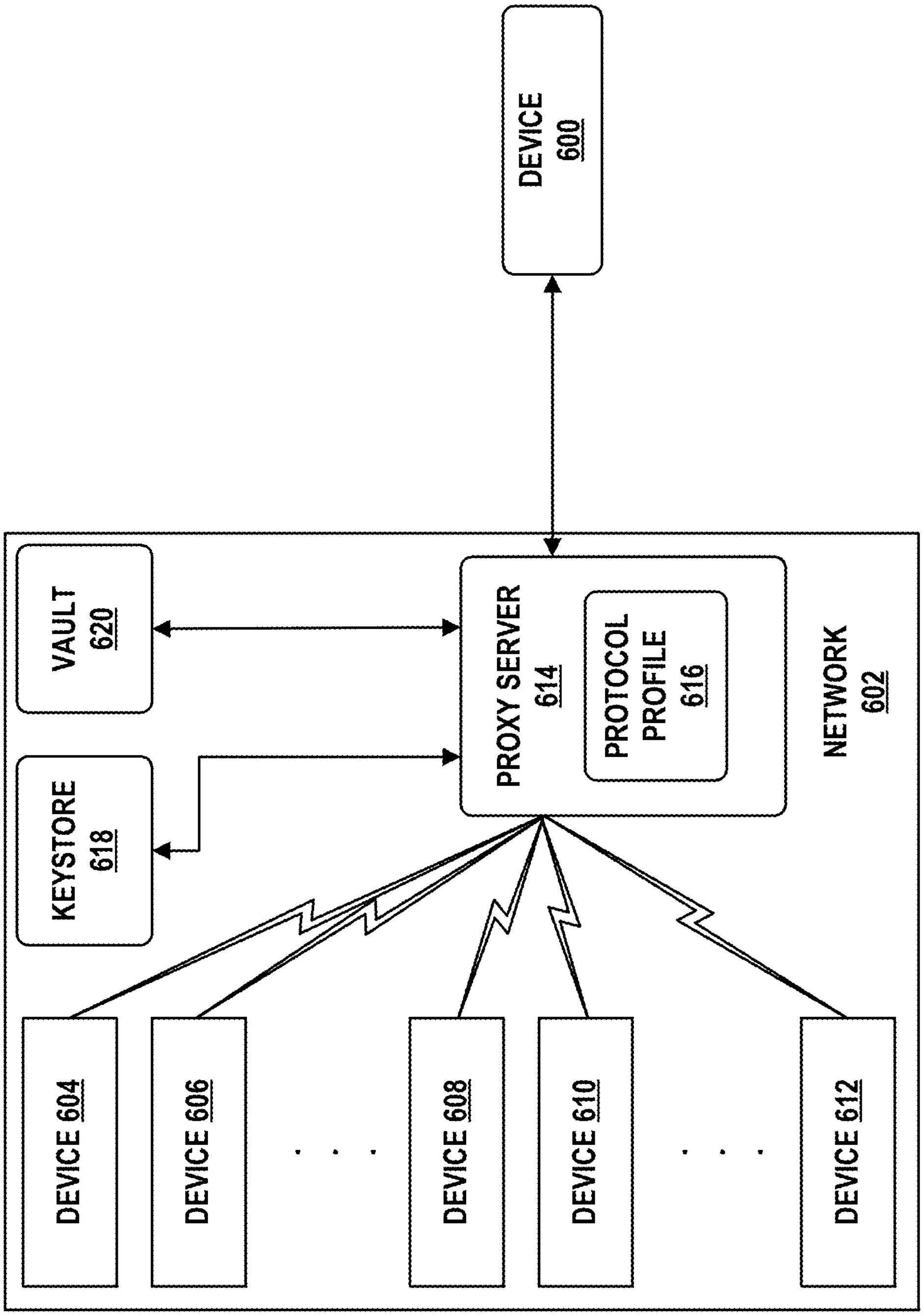
FIG. 6B depicts a second approach to credential storage and authentication for network communications, in accordance with example embodiments.

To address this, FIG. 6B depicts an alternative configuration of the device 600 and the network 602. This configuration operates similarly to that of FIG. 6A, except that the protocol profile 616 is stored on or is otherwise associated with the proxy server 614 rather than on the device 600. This may provide a further security advantage for several reasons.

For instance, this approach provides that the information contained with the protocol profile is stored directly on the network as opposed to being stored on an outside device. Accordingly, the information available for potential attackers to glean regarding the network is also reduced. This improves the security of the network by limiting the possible vectors or pathways along which a malicious actor may attack the network.

For these reasons, the approach depicted in FIG. 6B may be useful in situations that are even "lower-trust" than the approach above, for example networks dealing with sensitive information or those with particular data audit or compliance standards that restrict access of certain types of data to third parties, or networks desiring an even higher standard of security and privacy.

The information in the protocol profile 616 may be used to facilitate communications and access between the device 600 and the network 602, as is further discussed below with regards to FIGS. 7A and 7B.

B. Example Message Flow Diagrams

Figure 7A:
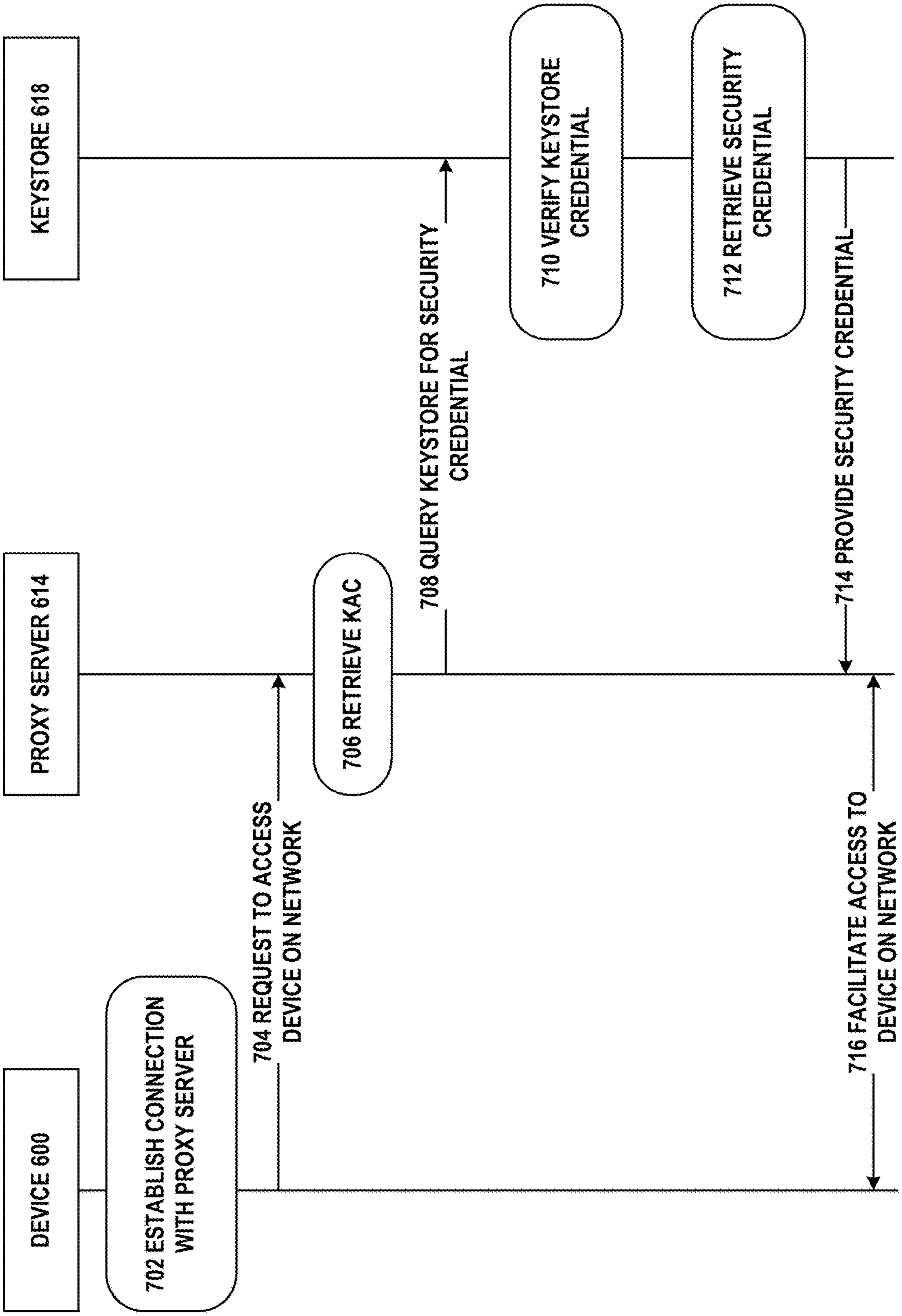
FIG. 7A depicts a message flow diagram related to network communications, in accordance with example embodiments.
Figure 7B:
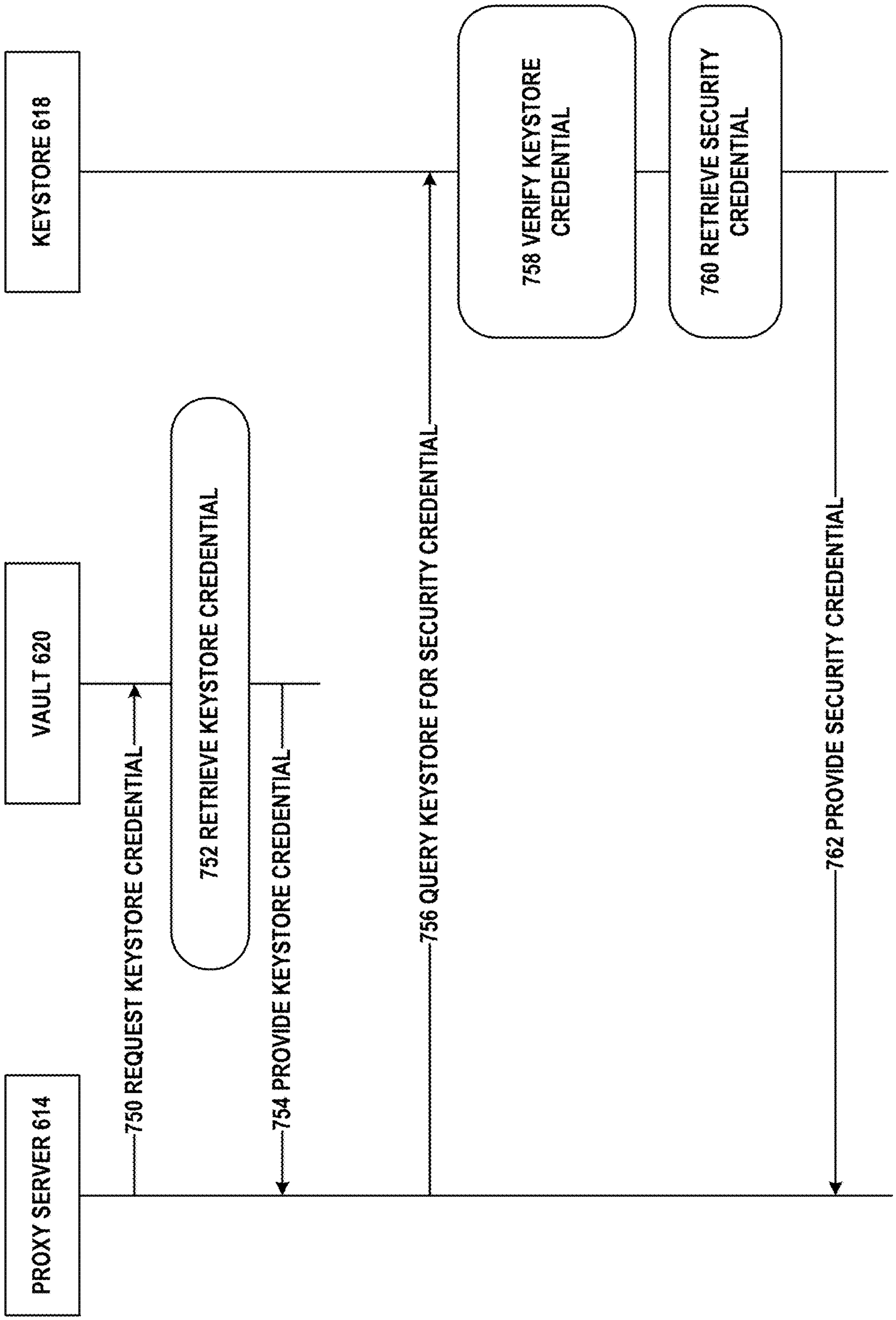
FIG. 7B depicts a message flow diagram related to network communications, in accordance with example embodiments.

FIGS. 7A and 7B depict message flow diagrams that illustrate example operations involved in outside devices accessing devices on networks through the use of stored security credentials. For instance, these operations may be performed by the example systems illustrated in FIGS. 6A and 6B.

As shown at block 702 of FIG. 7A, the device 600 may be configured to establish a network connection with the proxy server 614. This may occur through a TLS handshake or any other network protocol. The proxy server 614 may make a determination at this point as to whether such a connection should be established, which may occur according to a security policy. For instance, the proxy server 614 may be configured to deny a certain IP address or range of IP addresses, deny connections from certain regions of the world, only accept physical connections, and/or other restrictions. Alternatively, the proxy server 614 may have already established a connection with the device 600, at the initiative of the proxy server. In other words, a request from the device 600 (as below) may occur in response to an initiation of the communication from the proxy server to the device 600.

Regardless of whether the device 600 or proxy server 614 initiates the connection, once it is established, the device 600 may then request to access a device on the network 602, as represented by the arrow 704. In this example, the on-network device is device 612. As discussed previously, the proxy server 614 acts as the "gatekeeper" to the network 602 and facilitates all communication between the device 600 and device 612. This further limits the risk of a malicious actor performing an attack, as suspicious activity (unauthorized network requests, for instance) would be monitored by the proxy server 614. In some embodiments, this request represented by the arrow 704 may include one or more of the parameters of the protocol profile 616.

As shown at block 706, the proxy server 614 may retrieve a KAC. The KAC may be any type of security credential (e.g., a password, certificate, or cryptographic key) and is used to access the keystore 618. In some embodiments, the KAC may be a limited-time credential, as described above. For instance, the KAC may be issued by the keystore 618 and only be valid for a limited amount of time before expiration.

In some embodiments, the protocol profile 616 may store the KAC, and the KAC may then be provided to the proxy server 614 as part of the request of arrow 704. In other embodiments, the KAC may be stored in the vault 620, which is discussed below with regard to FIG. 7B.

After retrieving the KAC, the proxy server 614 may query the keystore 618 in order to retrieve the proper security credential for the device 612. This is represented by arrow 708. This query may include the KAC encoded within the request. The query may also occur using the file path of the keystore 618 contained in the protocol profile 616.

As shown at block 710, the keystore 618 may verify the KAC provided with the request. For instance, it may authenticate the KAC against a stored copy. In other instances, the KAC may include a cryptographic key that is used to decrypt at least part of the keystore 618 in order to retrieve the security credentials stored within.

Once access to the keystore 618 is granted, the security credential for device 612 may be retrieved, as shown at block 712. As noted above, the keystore 618 may be a dictionary or dictionary-like data structure using a key-value format. For instance, the keystore may have the following format for the entry relating to device 612: "credential_id": "credential," wherein the credential_id is a unique identifier for the device-specific security credential. Such a credential_id may be included within the protocol profile 616, as will be discussed below. In other words, querying the keystore may include inputting a credential identifier (e.g., credential_id) into the keystore and responsively receiving a security credential.

The proxy server 614 may have a list or other data structure containing one or more credential_ids associated with the devices on the network 602, and this ID may be included in the query of arrow 708 to the keystore 618.

The credential_id may also be transmitted from the device 600 along with the request of arrow 704 in embodiments where the protocol profile 616 is stored on the device 600 and subsequently along with the query of arrow 708 to the keystore 618. In embodiments where the protocol profile 616 is stored on the proxy server 614, it may be retrieved along with the KAC and the query of arrow 708.

The security credential for device 612 may then be provided to the proxy server 614, as represented by arrow 714. Following this retrieval, the proxy server 614 may use the security credential to facilitate communications and/or access between the device 600 and the device 612 on the network 602, as represented by the two-way arrow 716. For instance, the device 600 may issue commands to the device 600, retrieve files stored on the device 600, or change the configuration of software on the device 600.

In other words, the proxy server 614 may receive a command from the device 600, transmit a representation of the command to the device 612. The device 612 may execute that command, and the proxy server 614 may receive from the device 612 an output of the execution of the command. The proxy server 614 may then transmit a representation of the output of the execution of the command to the device 600.

The communications setup as described in FIG. 7A provides a technical improvement over existing methods, as the security credential for the device 612 is preferably not distributed outside of the network 602. This reduces the risk of security credentials becoming available to malicious actors and used for attacks on the network, which may result in data corruption and/or loss, as well as disruptions and downtime.

In some embodiments, the KAC may be stored in the vault 620, and thus the retrieval process for the KAC (as at block 706 above) may differ slightly to accommodate this added level of security. This process is illustrated in FIG. 7B.

As shown at arrow 750, the proxy server 614 may request the KAC from the vault 620. This request may include some level of authentication. For instance, the vault 620 may be configured to only allow access to certain users (e.g., an administrator or superuser) or certain devices (such as the proxy server 614).

As shown at block 752 and arrow 754, the vault 620 may then retrieve the KAC and provide it to the proxy server 614. In other words, the KAC may be obtained by the proxy server 614 by querying a secure vault within the network (e.g., vault 620), and responsively receiving, from the secure vault, the KAC.

The use of the vault 620 in this process provides a further security measure for the security credentials within the keystore 618, as it presents another level of security before such credentials may be accessed. This may further dissuade potential attackers should they gain unauthorized access to the network 602.

FIG. 7B, at arrow 756, blocks 758 and 760, and arrow 762, then may proceed similarly to arrow 708, blocks 710 and 712, and arrow 714 described above in relation to FIG. 7A.

Through the operations described with regards to FIGS. 7A and 7B, the device 600 is able communicate with devices on the network 602 in a secure fashion without the need to directly store security credentials on the device 600, which may be problematic for the reasons discussed above.

C. Example Data Model

As described above, the information contained in the protocol profile 616 may be used to facilitate communications between the device 600 and devices on the network 602.

Figure 8:
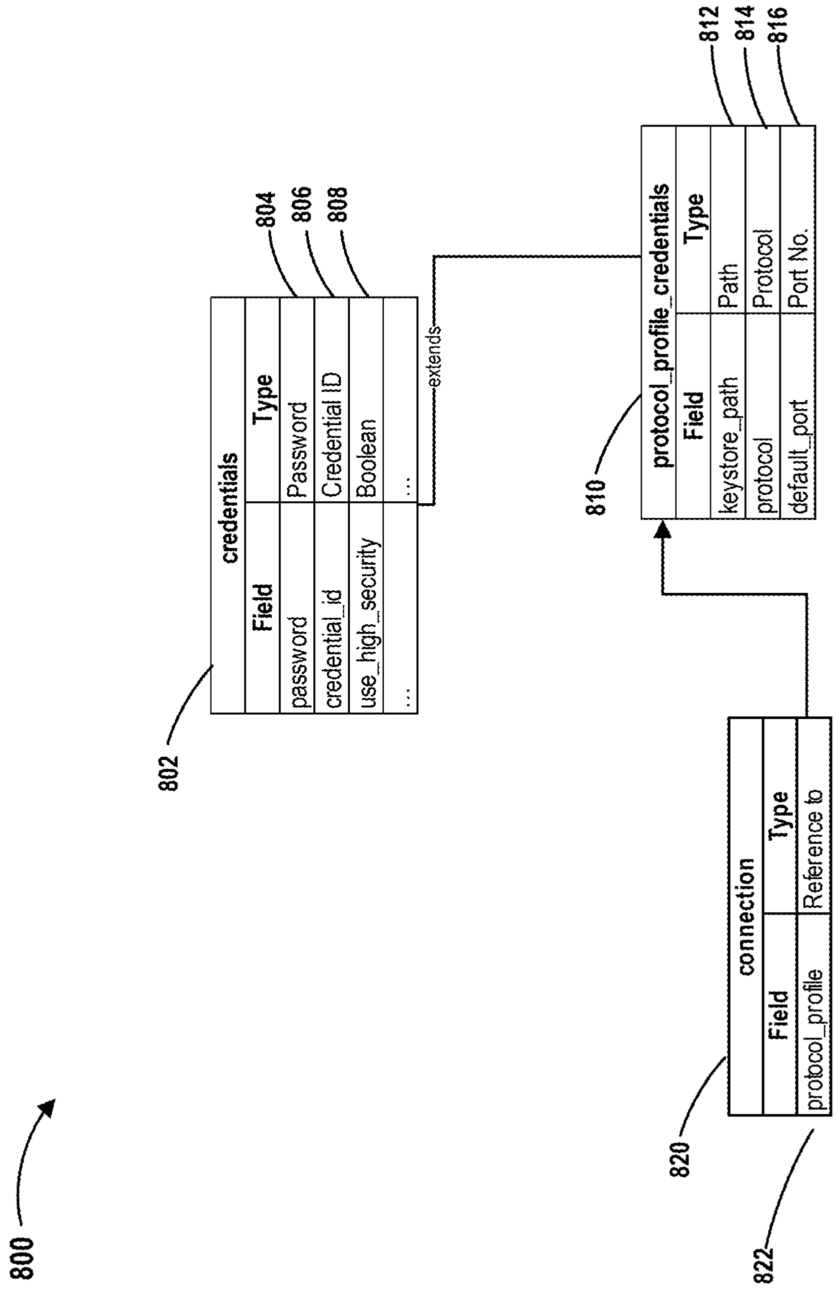
FIG. 8 depicts a data model associated with the storage of parameters for network communications, in accordance with example embodiments.

The protocol profile 616 itself may be arranged according to a data model 800, which is illustrated in FIG. 8. FIG. 8 depicts a credentials table 802. As shown, the credentials table 802 may be used to store security credentials related to accessing devices on the network 602. For example, the credentials table 802 may include a password 804, credential_id 806, and a use_high_security Boolean 808. Password 804 may be an alphanumeric password in some embodiments, but may also be a different type of security credential as discussed above. In some embodiments, such as those where the vault 620 is not present or unused, the password 804 may be the KAC.

Credential_id 806 is a unique identifier to identify the specific credential within the data model 800. For instance, the KAC may have a specific identifier. In such a situation, this information may signal to the proxy server 614 that it need not retrieve the KAC from the vault 620.

The use_high_security Boolean 808 provides a flag that, if enabled, informs the proxy server 614 that one or more of the approaches described herein are in use, and that credential access may follow a stricter or more stringent security procedure as opposed to direct access using security credentials stored on the device 600. In some embodiments, where the use_high_security Boolean 808 flag is disabled, the proxy server 614 may facilitate communication between device 600 and a device inside the network 602 using a stored security credential (e.g., the password 804 above).

The data model 800 of FIG. 8 also includes a protocol_profile_credentials table 810, which may store one or more instances of a protocol profile, such as the protocol profile 616 described above. In particular, protocol_profile_credentials table 810 extends the credentials table 802, encompassing the latter and providing further information related to device access. In some embodiments, the protocol_profile_credentials table 810 may only be used if the use_high_security Boolean 808 flag is enabled.

As shown, the protocol_profile_credentials table 810 may include a keystore_path 812, protocol 814, and default_port 816. The keystore_path 812 represents the file path (i.e., a location within the network 602) for the keystore 618. The path may be on a device on the network 602 that hosts the proxy server 614, a mounted storage drive, or other device within the network 602. The path may also be a URL or location within a shared filesystem of the network 602.

Protocol 814 specifies the protocol used for communication with the credential, such as any Internet Protocol suite protocols or associated security protocols, such as TLS and/or mutual TLS (mTLS), or any other secure communication protocol.

Default_port 816 specifies the default network port (e.g., a transport layer port) used by communications using the protocol 814, such as those for TCP and/or UDP communications over the network. In the case of different ports for each type of communication, a single version of a protocol_profile_credentials table 810 may include multiple entries of default_port 816 for each of the protocols 814 in the table.

In embodiments where the protocol profile 616 is stored on the device 600, some or all of the information contained in the protocol_profile_credentials table 810 may be transmitted to the proxy server 614 as part of the request of arrow 704 discussed above. In the configuration of FIG. 6B, where the protocol profile 616 is stored on the proxy server 614, no such transmission would be necessary.

In some embodiments, the data model 800 may also include a connection table 820. This may be used to provide configuration settings and/or preferences for network connections related to the network 602. Such a connection may be an HTTP connection, HTTPS connection, or any other network connection. Connection table 820 may include a protocol_profile reference 822, which may refer to an entry within the protocol_profile_credentials table 810 as described above.

The function of this additional table may be to associate connections with a specific protocol profile, which may be retrieved by the proxy server 614 when facilitating communication and movement of data between the devices on the network 602 and those outside of it. For example, a specific device on the network 602 (e.g., device 612) may have a protocol profile specifically associated with it. Thus, when the proxy server 614 connects to device 612 to facilitate communication with it for device 600, the proxy server 614 may locate the entry for device 612 within the connection table 820, and accordingly retrieve the appropriate protocol profile and thus retrieve the credentials necessary to access the device 612, as described above.

In some embodiments, including those where the device 600 is a computational instance 322 of the remote network management platform 320, the tables of the protocol profile 616 defined according to the data model 800 may be stored in the CMDB 500.

In some embodiments, the protocol profile 616, whether located on the device 600 or the proxy server 614, may be updated to contain new and/or different information. For instance, the device 600 or proxy server 614 may receive a replacement protocol profile from a computational instance of a remote network management platform and replace the original protocol profile 616 with the replacement further protocol profile. This may be done to update the parameters within to reflect new advancements in cryptography or other security features, or for other purposes.

VIII. Example Operations

Figure 9:
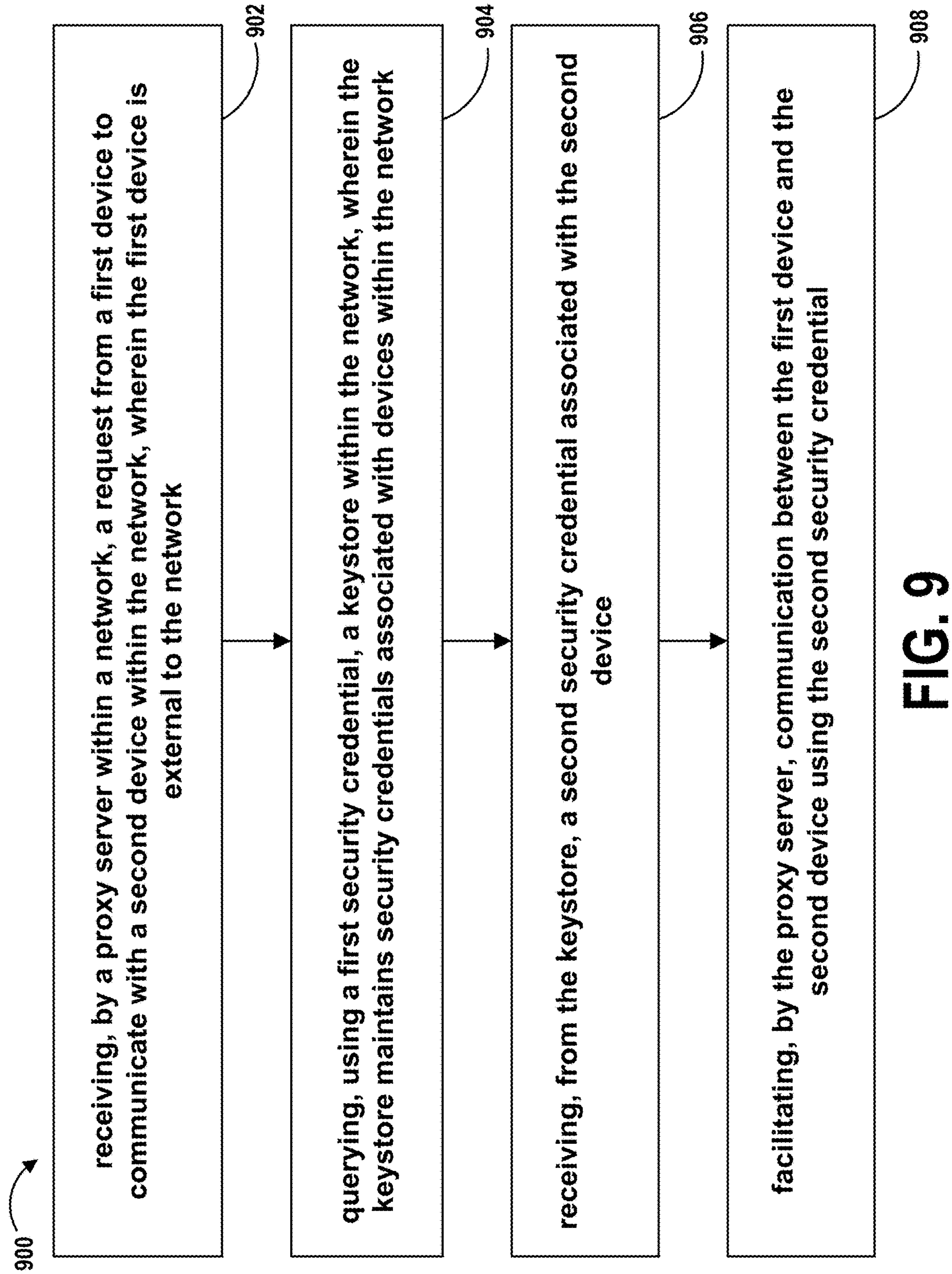
FIG. 9 is a flow chart, in accordance with example embodiments.

FIG. 9 is a flow chart illustrating an example embodiment. The method 900 illustrated by FIG. 9 may be carried out by a computing device, such as computing device 100, and/or a cluster of computing devices, such as server cluster 200. However, the process can be carried out by other types of devices or device subsystems. For example, the process could be carried out by a portable computer, such as a laptop or a tablet device.

The embodiments of FIG. 9 may be simplified by the removal of any one or more of the features shown therein. Further, these embodiments may be combined with features, aspects, and/or implementations of any of the previous figures or otherwise described herein.

Block 902 may involve receiving, by a proxy server within a network, a request from a first device to communicate with a second device within the network, and the first device may be external to the network.

This step represents a technical improvement, as the proxy server acting as a "gatekeeper" for devices within the network improves the security of communications for such devices, as any communication between a device within the network and device outside of the network must be facilitated by the proxy server. This further limits the risk of a malicious actor performing an attack, as suspicious activity (unauthorized network requests, for instance) would be monitored by the proxy server.

Block 904 may involve querying, using a first security credential, a keystore within the network, and the keystore maintains security credentials associated with devices within the network.

Block 906 may involve receiving, from the keystore, a second security credential associated with the second device.

These prior two steps represent a technical improvement, as locating the keystore within the network minimizes the possibility of security credentials being distributed outside the network. When such credentials are distributed outside of the network, especially if for an extended period of time or indefinitely, the security risk of a potential attacker (e.g., a user or malware) gaining access to these credentials increases the longer the credentials are available outside of the network. This risk can be significant given that the network may not be able to control how strictly the outside devices follow best practices when storing security credentials. Accordingly, the network may be subject to data corruption and/or loss, as well as disruptions and downtime. Thus, by minimizing the possibility of security credentials being distributed outside the network, these problems are mitigated.

Block 908 may involve facilitating, by the proxy server, communication between the first device and the second device using the second security credential.

To summarize, the steps of method 900 represent a technical improvement, as the security credential for the second device is preferably not distributed outside of the network 602. This reduces the risk of security credentials becoming available to malicious actors and used for attacks on the network, which may result in data corruption and/or loss, as well as disruptions and downtime.

In some embodiments, the request from the first device occurs in response to an initiation of the communication from the proxy server to the first device.

In some embodiments, the first device is within a computational instance of a remote network management platform.

In some embodiments, the first security credential is obtained by the proxy server by querying a secure vault within the network and receiving, from the secure vault, the first security credential. In some embodiments, the secure vault includes a tamper-resistant hardware component. In some embodiments, the secure vault is configured to deny access by default to all devices on the network except those in a predetermined list, and the predetermined list includes the proxy server.

In some embodiments, the first security credential includes a cryptographic key, and querying the keystore within the network includes decrypting at least part of the keystore using the cryptographic key.

In some embodiments, the keystore includes a dictionary, and querying the keystore within the network comprises inputting a credential identifier into the keystore and responsively receiving the second security credential.

In some embodiments, the second security credential is configured to be valid for no longer than a predetermined amount of time.

In some embodiments, the second security credential includes a one-time password.

In some embodiments, facilitating the communication between the first device and the second device includes receiving, from the first device, a command, transmitting, to the second device, a representation of the command, receiving, from the second device, an output of an execution of the command, and transmitting, to the first device, a representation of the output of the execution of the command.

In some embodiments, a protocol profile is stored on the first device. The protocol profile includes one or more parameters for the communication between the first device and the second device. The request from the first device to communicate with the second device within the network includes at least one of the one or more parameters for the communication between the first device and the second device. In some embodiments, the one or more parameters include a file path for the keystore, a secure communication protocol for the communication between the first device and the second device, and a transport layer port number associated with the secure communication protocol.

In some embodiments, a protocol profile is stored on the proxy server. The protocol profile includes one or more parameters for the communication between the first device and the second device. The one or more parameters include a file path for the keystore, a secure communication protocol for communications between the first device and the second device, and a transport layer port number associated with the secure communication protocol. In some embodiments, the file path for the keystore specifies a uniform resource locator (URL), location within a filesystem on a device within the network, or location within a shared filesystem of the network.

In some embodiments, the method 900 further involves receiving, from a computational instance of a remote network management platform, a further protocol profile, and replacing the protocol profile on the proxy server with the further protocol profile.

In some embodiments, the one or more parameters further includes a third security credential and a Boolean flag, and the method 900 further involves determining that the Boolean flag matches a predetermined value and facilitating, by the proxy server, communication between the first device and the second device using the third security credential.

In some embodiments, portions of the protocol profile are editable by one or more devices within the network.

IX. Closing

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of non-transitory computer readable medium such as a storage device including RAM, ROM, a disk drive, a solid-state drive, or another tangible storage medium.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments could include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A method comprising:

receiving, by a proxy server within a network, a request from a first device to communicate with a second device within the network, wherein the first device is external to the network, wherein the request from the first device occurs in response to an initiation of communication from the proxy server to the first device;

querying, using a first security credential, a keystore within the network, wherein the keystore maintains security credentials associated with devices within the network;

receiving, from the keystore, a second security credential associated with the second device; and facilitating, by the proxy server, further communication between the first device and the second device using the second security credential.

2. The method of claim 1, wherein the first device is within a computational instance of a remote network management platform.

3. The method of claim 1, wherein the first security credential is obtained by the proxy server by:

querying a secure vault within the network; and receiving, from the secure vault, the first security credential.

4. The method of claim 3, wherein the secure vault comprises a tamper-resistant hardware component.

5. The method of claim 3, wherein the secure vault is configured to deny access by default to all devices on the network except those in a predetermined list, wherein the predetermined list includes the proxy server.

6. The method of claim 1, wherein the first security credential comprises a cryptographic key, and wherein querying the keystore within the network comprises decrypting at least part of the keystore using the cryptographic key.

7. The method of claim 1, wherein the keystore comprises a dictionary, and wherein querying the keystore within the network comprises inputting a credential identifier into the keystore and responsively receiving the second security credential.

8. The method of claim 1, wherein the second security credential is configured to be valid for no longer than a predetermined amount of time.

9. The method of claim 1, wherein the second security credential comprises a one-time password.

10. The method of claim 1, wherein facilitating the further communication between the first device and the second device comprises:

receiving, from the first device, a command;

transmitting, to the second device, a representation of the command;

receiving, from the second device, an output of an execution of the command; and transmitting, to the first device, a representation of the output of the execution of the command.

11. The method of claim 1, wherein a protocol profile is stored on the first device, wherein the protocol profile includes one or more parameters for the further communication between the first device and the second device, and wherein the request from the first device to communicate with the second device within the network includes at least one of the one or more parameters for the further communication between the first device and the second device.

12. The method of claim 11, wherein the one or more parameters include a file path for the keystore, a secure communication protocol for the further communication between the first device and the second device, and a transport layer port number associated with the secure communication protocol.

13. The method of claim 1, wherein a protocol profile is stored on the proxy server, and wherein the protocol profile includes one or more parameters for the further communication between the first device and the second device, and wherein the one or more parameters include a file path for the keystore, a secure communication protocol for communications between the first device and the second device, and a transport layer port number associated with the secure communication protocol.

14. The method of claim 13, wherein the file path for the keystore specifies a uniform resource locator (URL), location within a filesystem on a device within the network, or location within a shared filesystem of the network.

15. The method of claim 13, further comprising:

receiving, from a computational instance of a remote network management platform, a further protocol profile; and replacing the protocol profile on the proxy server with the further protocol profile.

16. The method of claim 13, wherein the one or more parameters further include a third security credential and a Boolean flag, and wherein the method further comprises:

determining that the Boolean flag matches a predetermined value; and facilitating, by the proxy server, additional communication between the first device and the second device using the third security credential.

17. The method of claim 13, wherein portions of the protocol profile are editable by one or more devices within the network.

18. A proxy server within a network comprising:
one or more processors;
memory; and
program instructions, stored in the memory, that upon execution by the one or more processors cause the proxy server to perform operations comprising:
receiving a request from a first device to communicate with a second device within the network, wherein the first device is external to the network, wherein the request from the first device occurs in response to an initiation of communication from the proxy server to the first device;
querying, using a first security credential, a keystore within the network, wherein the keystore maintains security credentials associated with devices within the network;
receiving, from the keystore, a second security credential associated with the second device; and
facilitating further communication between the first device and the second device using the second security credential.

19. A non-transitory machine-readable medium storing program instructions that, when executed by one or more processors of a proxy server within a network, cause the proxy server to perform operations comprising:
receiving a request from a first device to communicate with a second device within the network, wherein the first device is external to the network, wherein the request from the first device occurs in response to an initiation of communication from the proxy server to the first device;
querying, using a first security credential, a keystore within the network, wherein the keystore maintains security credentials associated with devices within the network;
receiving, from the keystore, a second security credential associated with the second device; and
facilitating further communication between the first device and the second device using the second security credential.

* * * * *